(12) United States Patent
Liao et al.

(10) Patent No.: US 12,469,147 B2
(45) Date of Patent: Nov. 11, 2025

(54) WEAKLY-SUPERVISED 3D MEDICAL IMAGE SEGMENTATION USING GEOMETRIC PRIOR AND CONTRASTIVE SIMILARITY

(71) Applicant: City University of Hong Kong, Hong Kong (CN)

(72) Inventors: Jing Liao, Hong Kong (CN); Yan Xu, Hong Kong (CN); Hao Du, Hong Kong (CN); Qihua Dong, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 434 days.

(21) Appl. No.: 18/150,228

(22) Filed: Jan. 5, 2023

(65) Prior Publication Data

US 2024/0233134 A1 Jul. 11, 2024

(51) Int. Cl.
  *G06K 9/00* (2022.01)
  *G06N 3/045* (2023.01)
  *G06T 7/00* (2017.01)
  *G06T 7/194* (2017.01)

(52) U.S. Cl.
  CPC ............ *G06T 7/194* (2017.01); *G06N 3/045* (2023.01); *G06T 7/0012* (2013.01); *G06T 2207/20081* (2013.01); *G06T 2207/20084* (2013.01)

(58) Field of Classification Search
  None
  See application file for complete search history.

(56) References Cited

U.S. PATENT DOCUMENTS

| | | | |
|---|---|---|---|
| 2022/0198254 A1* | 6/2022 | Dalli | G06N 3/084 |
| 2023/0410483 A1* | 12/2023 | Chen | G06N 3/045 |

FOREIGN PATENT DOCUMENTS

CN 114401666 A * 4/2022 ........... A61B 5/0088

OTHER PUBLICATIONS

Tian, Zhi, et al., "Boxinst: High-performance instance segmentation with box annotations.", Proceedings of the IEEE/CVF Conference on Computer Vision and Pattern Recognition. 2021.

(Continued)

*Primary Examiner* — Wei Wen Yang
(74) *Attorney, Agent, or Firm* — S&F/WEHRW

(57) ABSTRACT

A weakly-supervised framework for segmenting a three-dimensional (3D) medical image incorporates information of geometric prior and contrastive similarity in a loss-based fashion for enhancing distinguishability of an organ in presence of complex organ shape and image artifacts (e.g., low-contrast tissues) in the image. Training images with bounding-box annotations are used to train the framework. The geometric prior is advantageously built on point-cloud representations, which are much more fine-grained and flexible than volume representations, thus serving as better supervision than an inherent property of the bounding-box annotations (i.e. height and width). Furthermore, using contrastive similarity encourages organ pixels to gather around in a contrastive embedding space. It helps more-effectively distinguish low-contrast tissues from the background than using the conventionally-used gray space.

13 Claims, 9 Drawing Sheets

(56) References Cited

OTHER PUBLICATIONS

Xie, Haozhe, et al., "Grnet: Gridding residual network for dense point cloud completion.", European Conference on Computer Vision. Springer, Cham, 2020.

Huang, Huimin, et al., "Medical image segmentation with deep atlas prior.", IEEE Transactions on Medical Imaging 40.12 (2021): 3519-3530.

* cited by examiner

WEAKLY-SUPERVISED 3D MEDICAL IMAGE SEGMENTATION USING GEOMETRIC PRIOR AND CONTRASTIVE SIMILARITY

LIST OF ABBREVIATIONS 2D two-dimensional
3D three-dimensional
ANN artificial neural network
CNN convolutional neural network
ICP iterative closest point

TECHNICAL FIELD

The present disclosure generally relates to 3D medical image segmentation under weak supervision. Particularly, the present disclosure relates to a weakly-supervised segmentation framework for segmenting 3D medical images, where the framework utilizes information on geometric prior and contrastive similarity in 3D medical image segmentation.

BACKGROUND

Segmentation is of fundamental importance for the understanding and interpretation of medical images, as it is essential for the diagnostic, treatment, and follow-up rehabilitation of various diseases. This task has been widely studied with the recent advent of deep CNNs [1], [2]. Nevertheless, there exists the main limitation that their methods require a large number of training images with pixel-wise annotations. The extremely high cost of collecting and annotating these training images largely hampers the performance and limits the scalability of deep CNNs in the medical domain. A popular paradigm to alleviate the need for pixel-wise annotations is the weakly-supervised segmentation with bounding-box annotations [3]-[7]. They employ bounding-box annotations to generate proposals, which are fake labels and thereby mimic full supervision.

Nevertheless, despite the good performances achieved by these works in certain practical scenarios, their applicability might be limited for two reasons: 1) complex shapes: Some organs have delicate structures, i.e. intra-kidney variabilities, which are difficult to be precisely segmented without pixel-wise supervision; 2) imaging artifacts: as discussed in previous works [8]-[10], various medical imaging artifacts caused by technical or physical problems make low-contrast tissues and non-homogenous textures hard to distinguish, especially in the conventionally widely-used gray space. The complex shapes and imaging artifacts largely limit the applicability of the weakly-supervised segmentation models in many scenarios, especially when segmenting complex structures.

There is a need in the art for a technique that overcomes challenges of complex organ shapes and imaging artifacts in limiting the applicability of weekly-supervised segmentation methods.

SUMMARY

A first aspect of the present disclosure is to provide a computer-implemented method for segmenting an input 3D medical image to give a plurality of segmentation masks.

The method comprises setting up a backbone, a mask head and a contrastive head. The backbone is a first ANN for generating a plurality of feature maps from the input 3D medical image. The mask head is a second ANN for generating the plurality of segmentation masks form the plurality of feature maps. The contrastive head is a third ANN for mapping feature-map pixels of the plurality of feature maps to an embedding space so as to determine a position of each feature-map pixel in the embedding space for evaluating a contrastive similarity between any two of the feature-map pixels. The method further comprises training the backbone, mask head and contrastive head with a plurality of training images. An individual training image is a 3D image annotated with one or more bounding-box annotations. An individual bounding-box annotation specifies a bounding box and a proposed organ located therein. The mask head utilizes a template organ as a geometric prior of the proposed organ in segmenting the individual training image for enhancing distinguishability of the proposed organ against background in presence of complex shape of the proposed organ. The mask head further utilizes contrastive similarity information of the plurality of feature maps in segmenting the individual training image for enhancing distinguishability of the proposed organ against background in presence of imaging artifacts in the individual training image. In particular, the mask head is trained by optimizing model parameters thereof in a sense of minimizing a loss computed by a sum of a geometric prior loss and a contrastive similarity loss for enhancing a performance of segmenting the input 3D medical image in inference in presence of complex organ shape and imaging artifacts in the input 3D medical image.

Preferably, each of the first, second and third ANNs is a CNN.

Preferably, the method further comprises setting up a completeness head for determining from the plurality of feature maps whether the proposed organ is a complete organ in the individual training image. Furthermore, the proposed organ is removed from being used in training the mask head if the proposed organ is determined to be incomplete in the individual training image.

In certain embodiments, the training of the backbone, mask head and contrastive head comprises training the mask head with the individual training image. The training of the mask head with the individual training image comprises: using the backbone, mask head and contrastive head to process the individual training image treated as the input 3D medical image to generate the plurality of feature maps, the plurality of segmentation masks and the position of each feature-map pixel in the embedding space; generating a proposal specifying the proposed organ inside the individual training image according to the individual bounding-box annotation; identifying the template organ as the geometric prior of the proposed organ; computing the geometric prior loss for the proposal according to a distance between first and second point clouds, the first point cloud representing the template organ, the second point cloud representing the proposed organ, the first and second point clouds being aligned; computing the contrastive similarity loss for the proposal according to segmentation-mask pixels of the plurality of segmentation masks and respective positions of the feature-map pixels in the embedding space; updating the model parameters of the mask head according to the sum of the geometric prior loss and the contrastive similarity loss; and performing the updating of the model parameters of the mask head for respective proposals generated for the one or more bounding-box annotations.

Preferably, the method further comprises setting up a completeness head for determining from the plurality of feature maps whether the proposed organ is a complete organ in the individual training image. The training of the mask head and contrastive head with the individual training image further comprises: using the completeness head to determine whether the proposed organ is a complete organ in the individual training image; and responsive to determining that the proposed organ is incomplete in the individual training image, removing the proposed organ from being used in training the mask head.

In certain embodiments, the geometric prior loss is computed as a Chamfer distance between the first and second point clouds.

In certain embodiments, the method further comprises: using a gridding reverse to convert a volume representation of the proposed organ to generate the second point cloud; obtaining a third point cloud as a point-cloud representation of the template organ; and applying a sparse registration procedure to the third point cloud for aligning point-cloud representations between the template organ and the proposed organ to thereby obtain the first point cloud. The sparse registration procedure comprises: sampling a preselected percentage of points uniformly across each of the second and third point clouds to thereby yield a reduced-size second point cloud and a reduced-sized third point cloud for the proposed organ and the template organ, respectively; calculating a transform matrix between the reduced-sized second and third point clouds; and registering the third point cloud to the second point cloud according to the transform matrix to yield the first point cloud.

In certain embodiments, the preselected percentage is 20%.

In certain embodiments, the transform matrix is calculated by an ICP registration tool.

It is preferable that the computing of the contrastive similarity loss for the proposal comprises: pre-training the contrastive head with a plurality of positive labels and a plurality of negative labels by optimizing model parameters of the contrastive head in a sense of minimizing a distance between neighboring positive labels in the plurality of positive labels while maximizing a distance between neighboring negative labels in the plurality of negative labels; and after the contrastive head is pre-trained, using the contrastive head to process the plurality of feature maps to generate the respective positions of the feature-map pixels in the embedding space.

Preferably, the contrastive head is pre-trained by performing a coarse stage and then a refine stage of pre-training. In the coarse stage, the plurality of positive labels is a first plurality of positive labels, and the plurality of negative labels is a first plurality of negative labels. The first plurality of positive labels is composed of the feature-map pixels located in the bounding box, and the first plurality of negative labels is composed of the feature-map pixels located outside the bounding box. In the refine stage, the plurality of positive labels is a second plurality of positive labels, and the plurality of negative labels is a second plurality of negative labels. The second plurality of positive labels and the second plurality of negative labels are determined by a procedure comprising: selecting a predetermined number of negative labels from the first plurality of negative labels as referral pixels; calculating a total distance between a feature-map pixel in the bounding box and each of the referral pixels; and determining whether the feature-map pixel is in the second plurality of positive labels or in the second plurality of negative labels according to the calculated total distance.

It is preferable that the backbone is a CNN having an encoder-decoder structure.

In certain embodiments, the contrastive head is composed of a two-layer point-wise convolution for assisting distinguishing organ tissues from non-organ tissues.

A second aspect of the present disclosure is to provide a computer-implemented method for segmenting a raw 3D medical image to yield a plurality of raw-image segmentation masks.

The method comprises: partitioning the raw 3D medical image into a plurality of 3D patches; processing an individual 3D patch by a computing process according to any of the embodiments of the method disclosed in the first aspect of the present disclosure to yield the plurality of segmentation masks, wherein the individual 3D patch is treated as the input 3D medical image, whereby respective pluralities of segmentation masks are obtained for the plurality of 3D patches; and concatenating the respective pluralities of segmentation masks to form the plurality of raw-image segmentation masks.

A third aspect of the present disclosure is to provide a first system for segmenting an input 3D medical image to give a plurality of segmentation masks. The first system comprises one or more computing devices configured to execute a computing process for segmenting the input 3D medical image to give the plurality of segmentation masks according to any of the embodiments of the method disclosed in the first aspect of the present disclosure.

A fourth aspect of the present disclosure is to provide a second system for segmenting a raw 3D medical image to yield a plurality of raw-image segmentation masks. The second system comprises one or more computing devices configured to execute a computing process for segmenting the raw 3D medical image to yield the plurality of raw-image segmentation masks according to any of the embodiments of the method disclosed in the second aspect of the present disclosure.

Other aspects of the present disclosure are disclosed as illustrated by the embodiments hereinafter.

Figure 1:
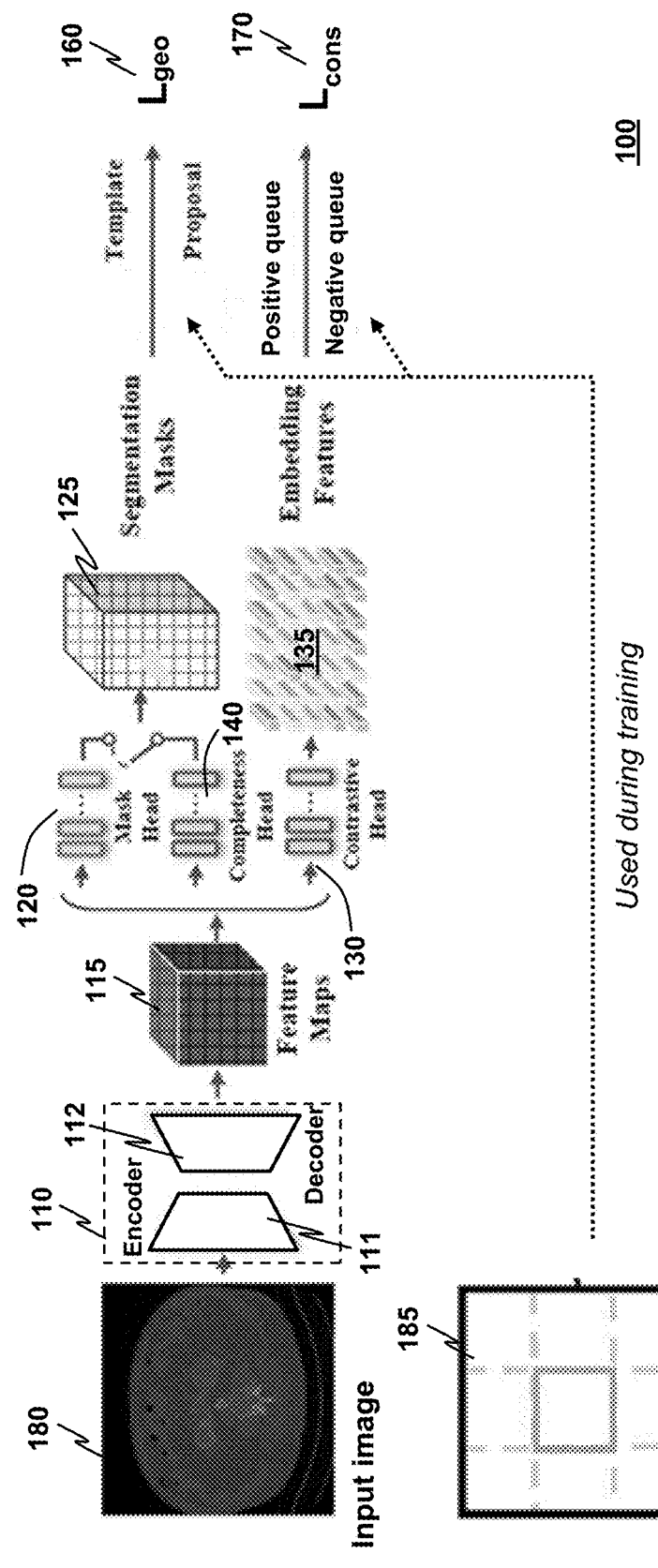
FIG. 1 depicts a two-branch schematic of an exemplary weakly-supervised segmentation framework in accordance with an exemplary embodiment of the present disclosure, where one branch of the framework is related to a geometric prior component and another branch is concerned with a contrastive similarity component.

Skilled artisans will appreciate that elements in the figures are illustrated for simplicity and clarity and have not necessarily been depicted to scale.

DETAILED DESCRIPTION

As used herein, "a 3D image" is an ordered sequence of 2D images, where the 2D images are respectively obtained at different locations along a straight line, and a plane of each 2D image is normal to the straight line. Note that a 3D image as used herein is not intended to mean a computer-generated graphic that provides a visual perception of depth to a human viewer similar to viewing a real-world object.

As used herein, "a 3D medical image" of a biological item is a 3D image formed as an ordered sequence of 2D cross-sectional images of the biological item, where the 2D cross-sectional images are obtained at different locations of the biological item along a straight line. The biological item may be an organ, such as a stomach, a brain, etc.

As used herein, "registration" of a first point cloud to a second point cloud or "registering" the first point cloud to the second point cloud means finding a spatial transformation (e.g., scaling, rotation and translation) that aligns the two point clouds.

As used herein, "an embedding space" is an embedding of a set of items within a manifold in which items resembling each other more closely are positioned closer to one another in the embedding space. Hence, a shorter distance between two points in the embedding space means that the two items represented by the two points more closely resemble each other. An embedding space is also known as a latent space.

To conquer the challenge of complex shapes in medical image segmentation, the present disclosure proposes learning the geometric prior of an organ by a standard organ template. Instead of using a volume representation of the organ, the gridding reverse [11] is first leveraged to convert a segmentation result from a volume representation to a point cloud representation and then compare the segmentation result with a template in the point cloud space. The basic unit in the point cloud representation is much more fine-grained and flexible than the volume representation (i.e. flexible point versus uniform voxel grids). As an advantage, it helps more-effectively describe delicate geometric structures. The point-cloud representation thus serves as better supervision than an inherent property of the bounding-box annotation (i.e. height and width). Furthermore, unlike the conventionally-used gray space [8], contrastive learning [12] is also leveraged to encode pixels to a high-dimensional embedding space and encourage the pixels of the same label to gather around. It helps alleviate imaging artifacts for richer expressivity in the embedding space when compared to the gray space. Thus, low-contrast tissues are more-effectively distinguished from the background than using the conventionally-used gray space.

Weakly-supervised segmentation with bounding box annotations earns increasing interest in medical image segmentation for its simplicity and low annotation cost. One can define a bounding box with two corner coordinates that are easy to store in real scenarios. In addition, the bounding box annotations are location-aware so that they provide a spatial relationship of a target object.

The present disclosure provides a weakly-supervised segmentation framework that incorporates geometric prior and contrastive similarity in a loss-based fashion. The framework is a flexible one as well so that it can be easily applied to improve multiple weakly-supervised segmentation models with bounding-box annotations, i.e. Ai+L [13], BoxInst [7]. By learning geometry prior from a given template and distinguishing low-contrast tissues by contrastive similarity, the framework can generate high-quality results with bounding box supervision only.

The framework has two major components, namely, a geometric prior component and a contrastive similarity component. In the geometric prior component, the shapes of proposals are constrained by a given template represented by a point cloud. Both external boundaries and internal structures of each proposal are optimized by minimizing a distance according to a given template. The contrastive similarity component addresses issues raised by medical imaging artifacts. By pre-training a contrastive head, the framework can successfully learn the difference between organ pixels and non-organ pixels. This component can more-effectively distinguish low-contrast tissues and non-homogenous textures than the conventionally widely-used gray space can.

Through extensive experiments, it can be demonstrated that the disclosed weakly-supervised segmentation framework can generate high-quality segmentation results, along with delicate internal details and accurate boundaries. Furthermore, it can be shown that the disclosed framework outperforms other bounding-box weakly-supervised methods [5], [7] under similar settings.

Figure 2:
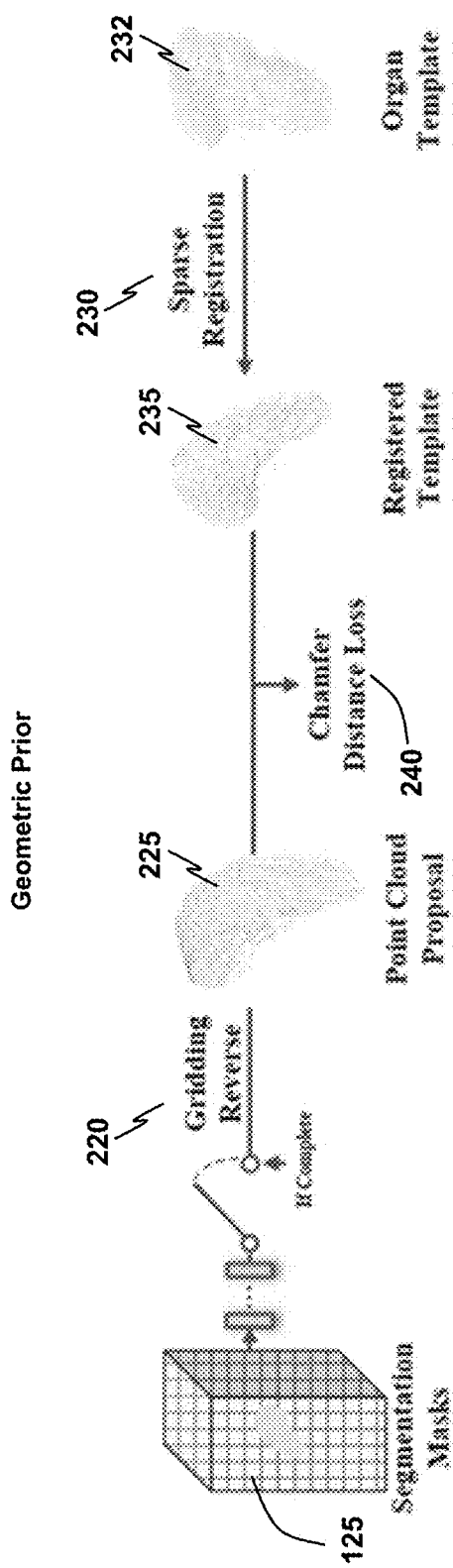
FIG. 2 illustrates the geometric prior component by depicting an exemplary processing flow for computing a geometric prior loss.
Figure 3:
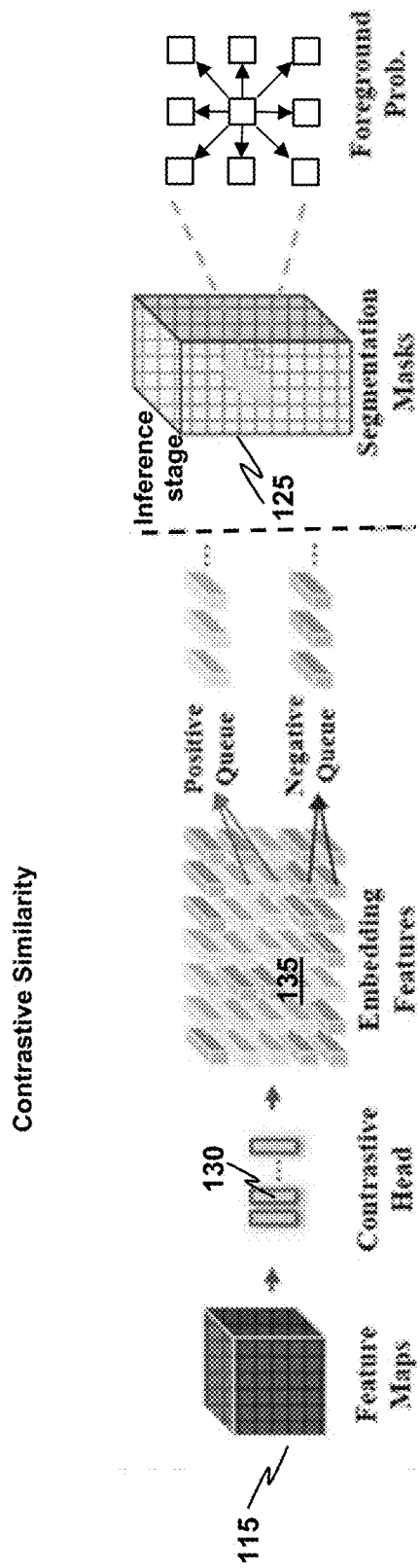
FIG. 3 provides an illustration of the contrastive similarity component.

The disclosed framework is illustrated as follows with the aid of FIGS. 1-3. FIG. 1 depicts a two-branch schematic of an exemplary weakly-supervised segmentation framework 100, in which one branch is related to a geometric prior component and another branch is concerned with a contrastive similarity component. FIG. 2 illustrates the geometric prior component by depicting an exemplary processing flow for computing a geometric prior loss. FIG. 3 provides an illustration of the contrastive similarity component.

A. Overall Structure of the Framework

Consider an input 3D medical image 180, $I \in R^{S \times H \times W}$, and a bounding-box annotation 185, $B^{1 \times 6}$, where S indicates a slice number, H indicates a height, W represents a width, and the bounding-box annotation 185 is constrained by its upper left coordinates and its bottom right coordinates. The weakly-supervised segmentation framework 100, denoted as F(•), obtains a pixel-wise segmentation mask $\mathcal{M} = F(I)$ and the training goal is to minimize a loss function $L_{frame}$ given by $$\min_F L_{frame}(I, B, F). \quad (1)$$

The pixel-wise segmentation mask $\mathcal{M}$ is provided by a plurality of segmentation masks 125 generated by the framework 100.

In the framework 100, the image I 180 is first encoded by a ConvNet encoder E 111. Similar to nnUNet, a multi-layer ConvNet is adopted as a decoder G 112 to obtain a plurality of feature maps 115, denoted as $P \in R^{S \times H \times W}$, where the decoder 112 shares the same layer number as the encoder 111. In the art, the encoder 111 and the decoder 112 are usually considered as a single ANN 110 having an encoder-decoder structure. This ANN 110 is referred to as a backbone 110 in the present disclosure. Usually the backbone 110 is realized as a CNN due to its advantages in image processing. In the geometric prior component, the plurality of feature maps 115 is processed by a mask head 120 to generate the plurality of segmentation masks 125. The mask head 120 is realized as an ANN, preferably a CNN. Additionally, for reasons to be explained later, it is desirable to determine whether an organ identified in the plurality of segmentation masks 125 is a complete organ. A completeness head 140 is used to process the plurality of feature maps 115 for determining if the organ is a complete one. In the contrastive similarity component, a contrastive head 130 is used to project the plurality of feature maps 115 into an embedding space to thereby generate a plurality of embedding features 135. The plurality of embedding features 135 provides contrastive similarity information of the plurality of feature maps 115.

The proposed geometric prior and contrastive learning are incorporated into the training of the mask head 120 to address the complex shapes and imaging artifacts issues. The training loss $L_{frame}$ is composed of two components, $L_{ori}$ and $L_{mask}$, such that $$L_{frame} = L_{ori} + L_{mask} \quad (2)$$

where $L_{ori}$ denotes the original training loss of a standard weakly-supervised framework (i.e. $L_{fcos}$ in BoxInst) and $L_{mask}$ stands for the training loss of the mask head 120. The training loss of the mask head 120 can be formulated by $$L_{mask} = L_{geo} + L_{cons}, \quad (3)$$

where $L_{geo}$ is a geometric prior loss 160 and $L_{cons}$ is a contrastive similarity loss 170. The mask head 120, which produces the plurality of segmentation masks 125, is further optimized by the geometric prior loss $L_{geo}$ 160 and the contrastive similarity loss $L_{cons}$ 170 as disclosed herein. More specifically, for the geometric prior loss 160, the completeness head 140 is constructed to predict a completeness score for every proposal, indicating the conditional probability that the object is completely inside the input. Each complete proposal is converted into a point cloud 225 (also referred to as a point cloud of a complete proposal 225) and is registered with a point cloud of the template organ 232 such that the point cloud of the template organ 232 is aligned with the point cloud of the complete proposal 225 and becomes a point cloud of a registered template 235. The Chamfer distance loss 240 is applied to minimize a distance between the point cloud of the complete proposal 225 and the point cloud of the registered template 235. Regarding the contrastive similarity loss 170, a contrastive head 130 to obtain the contrastive similarity by the plurality of feature maps 115 is constructed, where the contrastive head 130 assigns positive and negative labels to each position in the plurality of feature maps 115.

B. Geometric Prior

The proposed geometric prior is operated in a 3D point cloud space for two reasons. First, it is observed that 2D slices cannot well-preserve geometric continuity of 3D organs. Thus, the geometric shape of the organ is more preferably and advantageously learnt in a 3D embedding space. Second, the conventionally-used volume representation cannot handle segmentation of meticulous structures. The expressivity of the volume representation is largely limited by uniform voxel grids. To overcome this shortcoming, a gridding reverse [11] is leveraged to process segmentation of complex shapes in a point-cloud embedding space.

Refer to FIG. 2. The framework 100 utilizes the geometric prior to more-advantageously weakly-supervise the training of the mask head 120. The geometric prior refers to the boundary shape and internal distribution of the template organ 232. More specifically, a gridding reverse 220 as disclosed in [11] is introduced to form a bridge between the volume representation and the point cloud representation conversion. Using the point-cloud representation allows getting rid of the representation constraint in the volume representation. After converting both the template organ T and the proposal S into respective point cloud representations, the template organ is registered to the proposal by a widely-used ICP registration tool [14]. The geometric prior loss 160 given by the Chamfer distance 240 between the registered template 235 and the proposal 225 in the point cloud embedding space. Details of the conversion and registration of point clouds are first given, and then details of the geometric prior loss 160 are provided.

B.1. Conversion & Registration

To utilize the rich expressivity offered by a point cloud representation, the gridding reverse 220 as disclosed in [11] is introduced to help the transition between the volume representation and the point cloud representation. For each voxel grid, the gridding reverse 220 calculates a weighted sum of eight vertices of the corresponding grid and assigns the weighted sum to coordinates of a new point. Unlike uniform voxel grids, the high flexibility of points' coordinates enables the point cloud representation to describe meticulous and complex architectures. It helps more-effectively learn the difficult intra-organ variabilities in weakly-supervised segmentation. Furthermore, a sparse registration 230 is proposed for registering the template organ 232 with the proposal 225 in point-cloud representation. The sparse registration 230 is applied before calculating the Chamfer distance 240 between S and T. Tiny rotation of the template greatly impacts the calculation of the Chamfer distance 240, especially when the object structure is very complex. The registration [14] between the general shape of the proposal and the template is conducted. Specifically, we sample 20% points uniformly across the interval for the template and the proposal respectively, and then calculate the transform matrix between them by the ICP registration tool [14]. The template point cloud 232 is registered according to the transform matrix.

B.2. Loss Function

The geometric prior is then applied in the loss function of the mask head training that the Chamfer distance 240 between the proposal S 225 and the registered template organ T 235 is optimized. The geometric prior loss $L_{geo}$ 160 can be formulated as $$L_{geo} = \frac{1}{|S|} \sum_{x \in S} \min_{y \in T} \|x - y\|_2 + \frac{1}{|T|} \sum_{y \in T} \min_{x \in S} \|y - x\|_2. \quad (4)$$

Specifically, the mask head 120 produces probabilistic segmentation masks for proposals. The proposal is a probabilistic segmentation mask consisting of the segmented instances. This segmentation mask is further processed by the Gumbel-Softmax [15] to obtain the binary voxel. Locations of low probability are assigned to 0 and vice versa. The gridding reverse 220 is then adopted to obtain the point cloud proposal S from the binary voxel. Finally, the Chamfer distance between S and T is calculated as the geometric prior loss $L_{geo}$ 160. Note that the Chamfer distance of two point clouds is computed by summing the squared distances between nearest neighbor correspondences of the two point clouds.

B.3. Incomplete Organ

In processing a raw 3D medical image for segmentation, usually the raw 3D medical image is first partitioned into patches and these patches are then sequentially processed for segmentation. During the partitioning, however, organs may not be complete. It may cause failure of learning from the template. Thus, to ensure success of learning from the template, the completeness head 140 detects whether the proposal in the sampled patch (i.e. the input image 180) is complete. Only complete proposals are further processed. If the completeness head 140 is removed, some experimental results conducted by the Inventors indicate that the training performance is degraded by 1.1%.

C. Contrastive Similarity

Gray space performs poorly for the artifacts in medical imaging and similar surrounding tissues. It is not enough to distinguish between positive and negative pixels (i.e. organ pixels and non-organ pixels). Thus, contrastive learning is leveraged to calculate the contrastive similarity between different pixels. Encoding pixels to high-dimensional features and encouraging pixels of the same label to gather around in the embedding space helps increase the distinguishability.

To calculate the contrastive similarity, a ConvNet contrastive head 130 is used to process the plurality of feature maps 115. In particular, a two-layer point-wise convolution $h(\cdot)$ is installed in the contrastive head 130 to extract distinct representations from the plurality of feature maps P 115. More specifically, the contrastive head 130 is first pre-trained in a coarse-to-fine fashion where only bounding box annotations are included in the pre-training stage. Feature-map pixels in the plurality of feature maps 115 are encoded into embedding features $\mathcal{C}$ =h(P) 135, and pixels of the same label are encouraged to gather around in the embedding space. As used herein, the contrastive similarity between two pixels is defined as the distance of the two pixels in the embedding space. To calculate the contrastive similarity loss 170 for the whole image 180, an undirected graph is constructed where the vertices correspond to the pixels and edges are links between neighboring pixels. The contrastive similarity associated with each edge is then summarized for the calculation of the overall contrastive similarity loss.

C.1. Pre-Training

The pre-training of the contrastive head 130 is conducted in a weakly-supervised fashion that only bounding box annotations are included in the pre-training stage. To be more specific, there are two sub-stages in the pre-training stage: coarse and refine. In the coarse stage, pixels within the bounding box are taken as positive labels and pixels outside the bounding box as negative labels. Then the contrastive head 130 is trained by such labeling. However, the performance of the contrastive head 130 is largely limited by noisy labels. Thus, the refine stage is included to further improve the performance of the contrastive head 130. In the refine stage, K negative pixels are first randomly selected as referring pixels. For each pixel within the bounding box, one first calculates the distance D between all K referring pixels by $$\mathcal{D}_{u,v,z} = \sum_{i=1}^{K} \mathbb{1}\{(C_{u,v,z} \cdot C_i) \geq \tau\} \quad (5)$$

where $\mathcal{C}_{u,v,z} \in R^{S \times H \times W}$ indicates the feature at the coordinate (u, v, z) of the embedding space, 1 stands for 1 if the distance is greater than $\tau$ and 0 if less, and $\tau$ is a threshold for deciding whether pixels are positive or negative. If $\mathcal{D}_{u,v,z}$ is greater than K/2, the pixel at location (u, v, z) is considered positive; otherwise the pixel is considered negative. Afterwards, the contrastive head 130 is trained by using the same training loss as in the coarse stage, which is formulated as $$\text{loss} = -\frac{1}{|\Omega|} \sum_{(u,v,z) \in \Omega} \frac{1}{|\mathcal{P}(u,v,z)|} \cdot \log \frac{\sum_{(u_p,v_p,z_p) \in \mathcal{P}(u,v,z)} \exp\left(C_{u,v,z} \cdot C_{u_p,v_p,z_p}/\tau\right)}{\sum_{(u_n,v_n,z_n) \in \mathcal{N}(u,v,z)} \exp\left(C_{u,v,z} \cdot C_{u_n,v_n,z_n}/\tau\right)} \quad (6)$$

where: $\mathcal{C}_{u,v,z} \in R^{S \times H \times W}$ indicates the feature at the coordinate (u, v, z) of the feature map; $\Omega$ stands for all points inside input; $\mathcal{P}$ (u, v, z) denotes the set of points with the same label as the pixel at (u, v, z); N denotes the set of points with different labels; and T is the threshold as mentioned above.

C.2. Loss Function

Consider an undirected graph G=(V, E) built on the input image I 180, where V corresponds to pixels and E indicates edges between neighboring pixels. The predicted segmentation mask in the plurality of segmentation masks 125 can be viewed as a probability of pixel (u, v, z) being foreground. Then the probability of pixel $(u_1, v_1, z_1)$ and pixel $(u_2, v_2, z_2)$ being of the same label is given by $$\text{Prob}(y_e = 1) = \tilde{M}_{u_1,v_1,z_1} \cdot \tilde{M}_{u_2,v_2,z_2} + \left(1 - \tilde{M}_{u_1,v_1,z_1}\right) \cdot \left(1 - \tilde{M}_{u_2,v_2,z_2}\right) \quad (7)$$

where $\tilde{M}$ indicates the foreground probability mask and ye represents the label of the edge.

Thus, one can define an indicator on each edge to indicate whether certain pixels belong to the same label. If the contrastive similarity between two neighboring pixels is above the pre-defined threshold $\tau$, the indicator on the edge linking them is assigned to 1, and 0 otherwise. Afterwards, one discards the edges with 0 and further summarizes the contrastive similarity loss 170 of positive edges. The contrastive similarity loss 170 can be formulated as $$L_{cons} = -\frac{1}{N} \sum_{e \in E_{in}} \mathbb{1}_{\{C_{start} \cdot C_{start} \geq \tau\}} \log \text{Prob}(y_e = 1). \quad (8)$$

It serves as the contrastive similarity loss 170 of the whole image 180.

C. Details of Embodiments of Present Disclosure

Embodiments of the present disclosure are elaborated as follows based on the details, examples, applications, etc., of the weakly-supervised segmentation framework 100 as disclosed above in Sections A and B.

A first aspect of the present disclosure is to provide a computer-implemented method for segmenting an input 3D medical image to give a plurality of segmentation masks.

Figure 4:
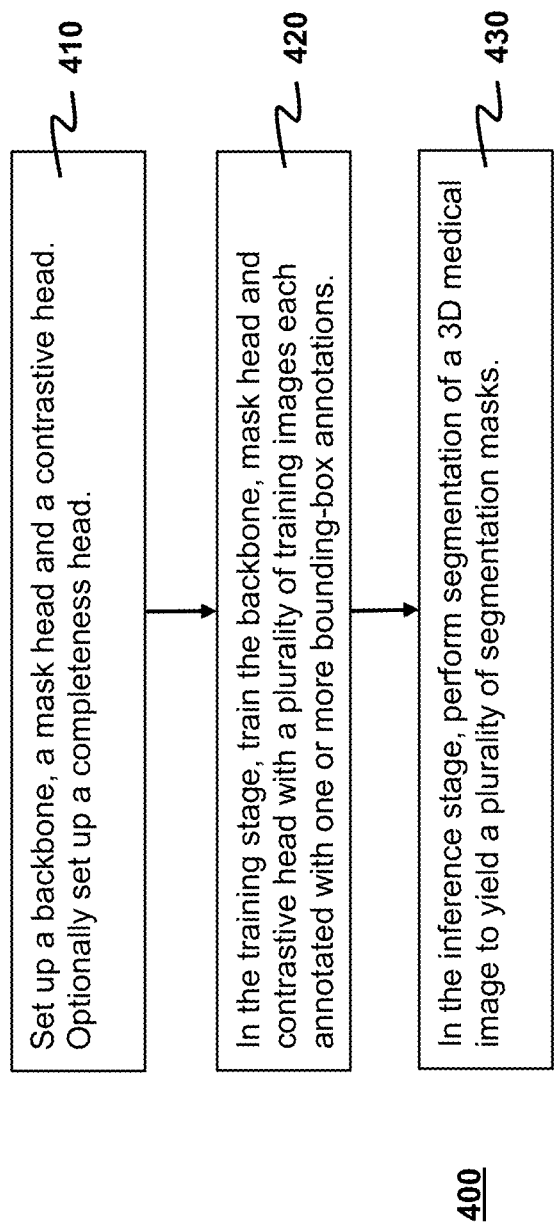
FIG. 4 depicts a flowchart showing exemplary steps of a computer-implemented method as disclosed herein for segmenting an input 3D medical image to give a plurality of segmentation masks.

The method is illustrated with the aid of FIG. 4, which depicts a first computer-implemented process 400 comprising exemplary steps of the disclosed method. The first process 400 comprises steps 410, 420 and 430.

The step 410 is an initialization step, which sets up a backbone 110, a mask head 120 and a contrastive head 130. By "setting up" a backbone 110, a mask head 120 and a contrastive head 130, it is meant that the backbone 110, mask head 120 and contrastive head 130 are software modules that can be implemented/programmed in one or more computing devices such as a computer. The backbone 110 is a first ANN for generating a plurality of feature maps 115 from an input 3D medical image 180. The mask head 120 is a second ANN for generating a plurality of segmentation masks 125 form the plurality of feature maps 115. The contrastive head 130 is a third ANN for mapping feature-map pixels of the plurality of feature maps 115 to an embedding space so as to determine a position of each feature-map pixel in the embedding space for evaluating a contrastive similarity between any two of the feature-map pixels. Note that the plurality of feature maps 115 is projected onto the embedding space to form a plurality of embedding features 135.

The step 420 is executed during the training stage. In the step 420, the backbone 110, mask head 120 and contrastive head 130 are trained with a plurality of training images. An individual training image is a 3D image annotated with one or more bounding-box annotations. An individual bounding-box annotation specifies a bounding box and a proposed organ located therein. In the step 420, the mask head 120 utilizes a template organ as a geometric prior of the proposed organ in segmenting the individual training image for enhancing distinguishability of the proposed organ against background in presence of complex shape of the proposed organ. The mask head 120 further utilizes contrastive similarity information of the plurality of feature maps 115 in segmenting the individual training image for enhancing distinguishability of the proposed organ against background in presence of imaging artifacts in the individual training image. Particularly, the mask head 120 is trained by optimizing model parameters of the mask head 120 in a sense of minimizing a loss computed by a sum of a geometric prior loss and a contrastive similarity loss for enhancing a performance of segmenting the input 3D medical image 180 in inference in presence of complex organ shape and imaging artifacts in the input 3D medical image.

The step 430 is executed during the inference stage. In the step 430, the input 3D medical image 180 is processed with the backbone 110, mask head 120 and contrastive head 130 after training to yield the plurality of segmentation masks 125.

Preferably, each of the first, second and third ANNs is a CNN. Practically, it is preferable that the backbone 110 is a CNN having an encoder-decoder structure.

As mentioned above, it is possible that an organ in the input 3D medical image 180 may be incomplete due to generating the input 3D medical image 180 by partitioning a raw 3D image into plural 3D images. It is desirable and advantageous to remove an incomplete organ from training the three ANNs. Despite this, the present disclosure is not limited only to removing the incomplete organ from the training. The incomplete organ may be included in the training, though a certain amount of performance degradation is resulted.

Preferably, the step 410 further sets up a completeness head 140 for determining from the plurality of feature maps 115 whether the proposed organ is a complete organ in the individual training image. The proposed organ is removed from being used in training the mask head 120 if the proposed organ is determined to be incomplete in the individual training image. Note that the completeness head 140 is a software module in a computing environment.

Figure 5:
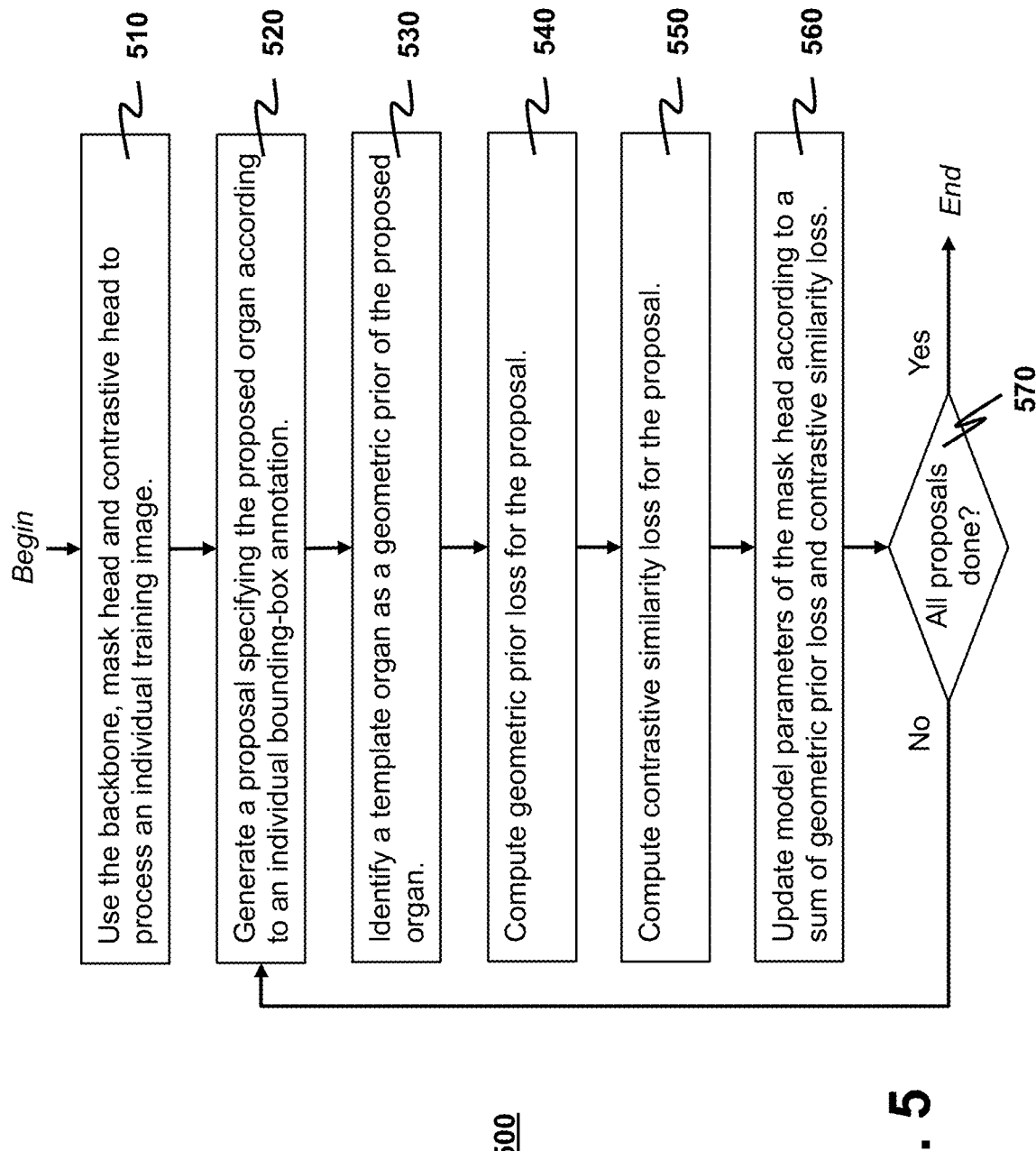
FIG. 5 depicts a flowchart showing exemplary steps taken in training a mask head of the framework with a training image.

The step 420 comprises training the mask head 120 with the individual training image. The aforementioned training of the mask head 120 is repeated for all respective training images in the plurality of training images. FIG. 5 depicts a flowchart showing exemplary steps in a step 500 for training the mask head 120 with the individual training image. The step 500 comprises steps 510, 520, 530, 540, 550, 560 and 570.

In the step 510, the backbone 110, mask head 120 and contrastive head 130 are employed to process the individual training image treated as the input 3D medical image 180 to generate the plurality of feature maps 115, the plurality of segmentation masks 125 and the position of each feature-map pixel in the embedding space.

In the step 520, a proposal specifying the proposed organ inside the individual training image is generated according to the individual bounding-box annotation.

In the step 530, the template organ is identified. The template organ is used as the geometric prior of the proposed organ.

In the step 540, the geometric prior loss 160 is computed for the proposal according to a distance between first and second point clouds. The first point cloud represents the template organ. The second point cloud represents the proposed organ. The first and second point clouds are aligned. Regarding the distance between the first and second point clouds, the distance may be Chamfer distance, Wasserstein distance, or a certain distance as considered appropriate by those skilled in the art. In certain embodiments, the geometric prior loss 160 is computed as a Chamfer distance between the first and second point clouds.

In the step 550, the contrastive similarity loss 170 is computed for the proposal according to segmentation-mask pixels of the plurality of segmentation masks 125 and respective positions of the feature-map pixels in the embedding space.

In the step 560, the model parameters of the mask head 120 are updated according to the sum of the geometric prior loss 160 and the contrastive similarity loss 170.

In the step 570, the updating of the model parameters of the mask head 120 is repeated for respective proposals generated for the one or more bounding-box annotations.

As mentioned above, it is preferable that the proposed organ is removed from being used in training the mask head 120 if the proposed organ is determined to be incomplete in the individual training image. As such, preferably the first process 400 further comprises a step 600 for controlling whether or not to use the proposed organ in training the mask head 120 according to whether or not the proposed organ is complete.

Figure 6:
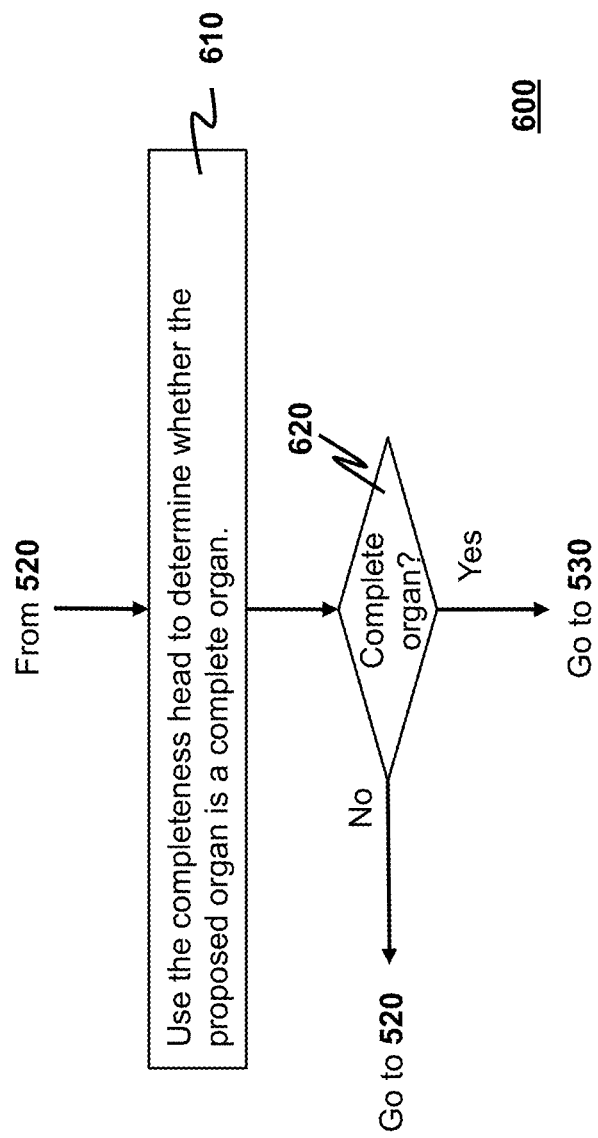
FIG. 6 depicts exemplary steps used in controlling whether or not to use a proposed organ in training the mask head.

FIG. 6 depicts exemplary steps used in the step 600. The step 600 comprises steps 610 and 620. In the step 610, which follows from the step 520, the completeness head 140 is employed to determine whether the proposed organ is a complete organ in the individual training image. The step 620 determines whether the proposed organ is to be used in training the mask head 120. If it is determined in the step 610 that the proposed organ is incomplete in the individual training image, then the proposed organ is removed from being used in training the mask head 120 by going back to the step 520; otherwise proceed to the step 530.

Figure 7:
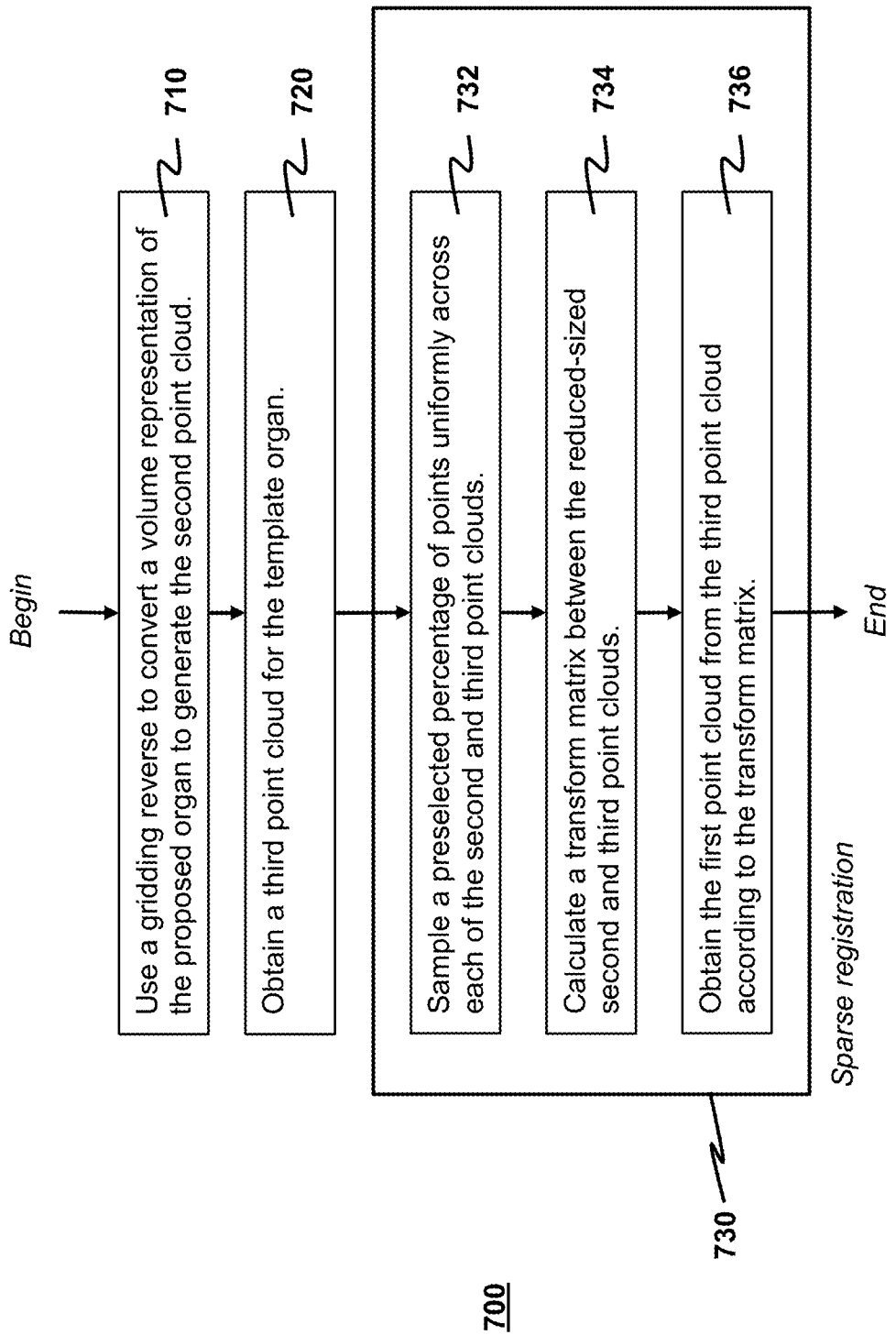
FIG. 7 depicts exemplary steps used in obtaining two point-cloud representations of the template organ and of the proposed organ, where the two point-cloud representations are used for computing the geometric prior loss.

In certain embodiments, the first process 400 further comprises a step 700 for obtaining the first and second point clouds before computing the geometric prior loss 160 in the step 540. FIG. 7 depicts exemplary steps used in the step 700. The step 700 comprises steps 710, 720 and 730.

In the step 710, a gridding reverse is employed to convert a volume representation of the proposed organ to generate the second point cloud.

In the step 720, a third point cloud is obtained as a point-cloud representation of the template organ. The third point cloud may be directly obtained from a database as the template organ is a standard organ, or may be generated from, e.g., a volume representation of the template organ.

In the step 730, a sparse registration procedure is applied to the third point cloud for aligning point-cloud representations between the template organ and the proposed organ to thereby obtain the first point cloud. In particular, the sparse registration procedure comprises steps 732, 734 and 736.

In the step 732, a preselected percentage of points is sampled uniformly across each of the second and third point clouds to thereby yield a reduced-size second point cloud and a reduced-sized third point cloud for the proposed organ and the template organ, respectively. The preselected percentage may be selected, for example, to be a value between 10% and 20%, a value between 20% and 30%, a value between 30% and 40%, or a value between 40% and 50%. Preferably, the preselected percentage is selected to be 20%.

In the step 734, a transform matrix between the reduced-sized second and third point clouds is calculated. The transform matrix may be calculated by an ICP registration tool.

In the step 736, the third point cloud is registered to the second point cloud according to the transform matrix, thereby yielding the first point cloud. Note that availability of both the first and second point clouds enables the geometric prior loss 160 to be readily computed in the step 540.

Figure 8:
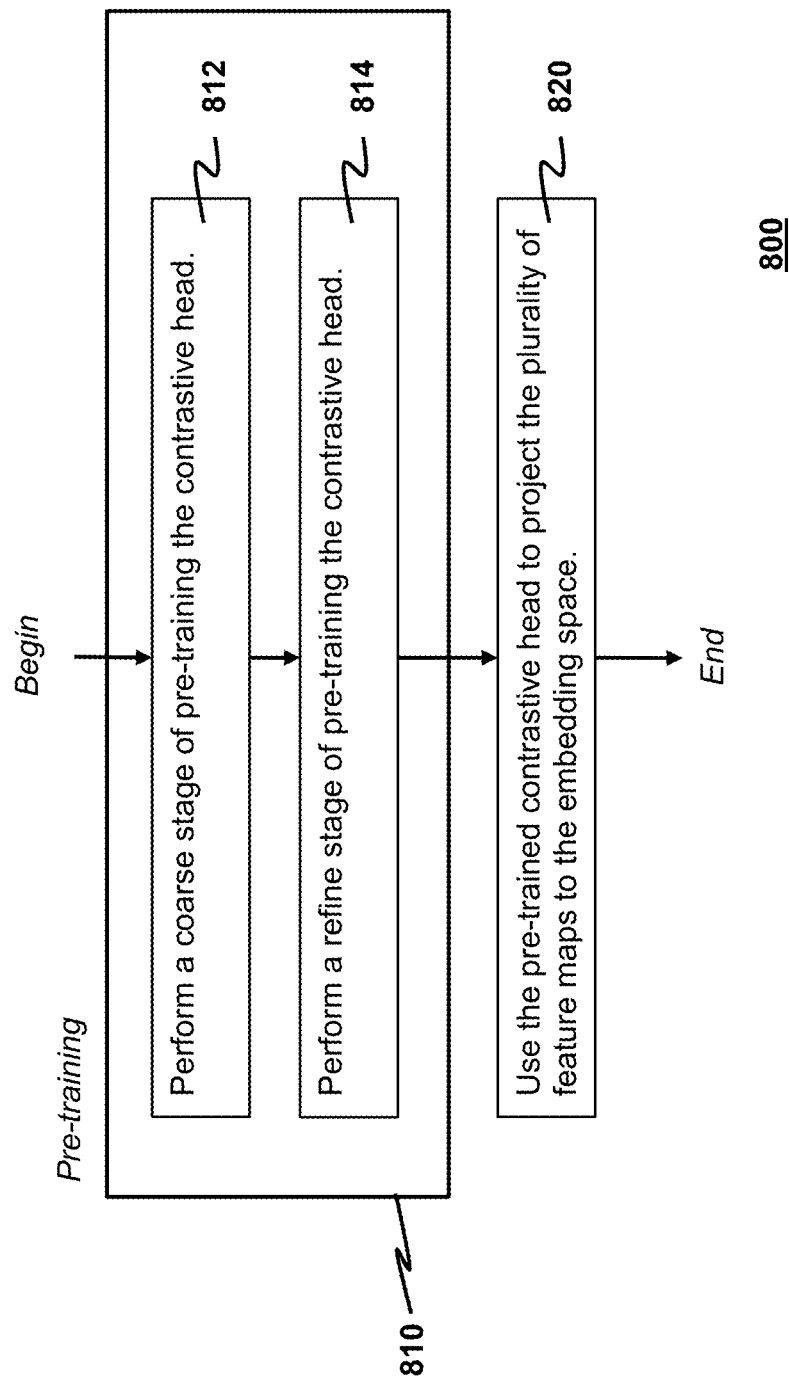
FIG. 8 depicts exemplary steps used in determining respective positions of feature-map pixels in an embedding space, where the respective positions of feature-map pixels are used for computing the contrastive similarity loss.

In certain embodiments, the first process 400 further comprises a step 800 for determining the respective positions of the feature-map pixels in the embedding space before computing the contrastive similarity loss for the proposal in the step 550. FIG. 8 depicts exemplary steps used in the step 800. The step 800 comprises steps 810 and 820.

In the step 810, the contrastive head 130 is pre-trained according to a plurality of positive labels and a plurality of negative labels by optimizing model parameters of the contrastive head in a sense of minimizing a distance between neighboring positive labels in the plurality of positive labels while maximizing a distance between neighboring negative labels in the plurality of negative labels. In particular, the contrastive head 130 is pre-trained by performing a coarse stage and then a refine stage of pre-training. The step 810 includes a step 812 of performing the coarse stage, and a step 813 of performing the refine stage.

In the step 812, the plurality of positive labels is a first plurality of positive labels, and the plurality of negative labels is a first plurality of negative labels. The first plurality of positive labels is composed of the feature-map pixels located in the bounding box. The first plurality of negative labels is composed of the feature-map pixels located outside the bounding box.

In the step 814, the plurality of positive labels is a second plurality of positive labels, and the plurality of negative labels is a second plurality of negative labels. The second plurality of positive labels and the second plurality of negative labels are determined by a procedure comprising the following steps. First, a predetermined number of negative labels is selected from the first plurality of negative labels as referral pixels. Second, a total distance between a feature-map pixel in the bounding box and each of the referral pixels is calculated. Third, whether the feature-map pixel is in the second plurality of positive labels or in the second plurality of negative labels is determined according to the calculated total distance.

After the contrastive head 130 is pre-trained in the step 810, the contrastive head 130 is employed to process the plurality of feature maps 115 to thereby generate the respective positions of the feature-map pixels in the embedding space in the step 820, whereby the contrastive similarity loss for the proposal is obtainable.

In certain embodiments, the contrastive head is composed of a two-layer point-wise convolution for assisting distinguishing organ tissues from non-organ tissues.

In practical situations, a raw 3D medical image is very often partitioned into a plurality of 3D patches and different 3D patches in the plurality of 3D patches are sequentially processed for medical image segmentation. Each 3D patch is segmented under weak supervision by the first process 400.

A second aspect of the present disclosure is to provide a computer-implemented method for segmenting a raw 3D medical image to yield a plurality of raw-image segmentation masks.

Figure 9:
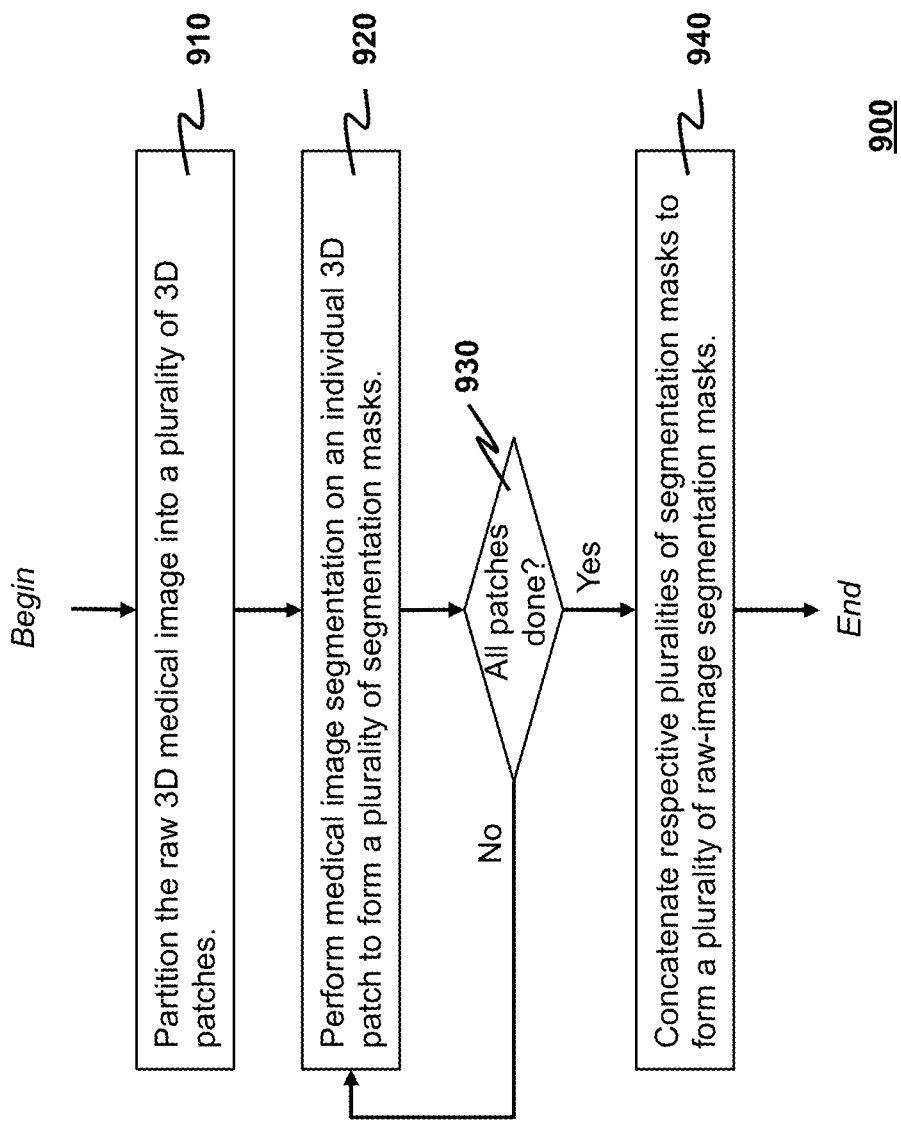
FIG. 9 depicts a flowchart showing exemplary steps of a computer-implemented method as disclosed herein for segmenting a raw 3D medical image to yield a plurality of raw-image segmentation masks.

FIG. 9 depicts a second computer-implemented process 900 showing exemplary steps of the disclosed method. In step 910, the raw 3D medical image is partitioned into a plurality of 3D patches. An individual 3D patch is processed by a computing process to yield the plurality of segmentation masks in step 920. In particular, the computing process is realized according to any of the embodiments of the first process 400 disclosed above in the first aspect of the present disclosure, with the individual 3D patch being treated as the input 3D medical image 180 in the first process 400. The step 920 is repeated until all respective 3D patches in the plurality of 3D patches are processed (step 930). As a result, respective pluralities of segmentation masks are obtained for the plurality of 3D patches. In step 940, the respective pluralities of segmentation masks are concatenated to form the plurality of raw-image segmentation masks.

Each of the first and second processes 400, 900 disclosed above may be implemented by one or more computing devices.

A third aspect of the present disclosure is to provide a first system for segmenting an input 3D medical image to give a plurality of segmentation masks. The first system comprises one or more computing devices configured to execute a first computing process for segmenting the input 3D medical image to give the plurality of segmentation masks according to any of the embodiments of the first computer-implemented process 400.

A fourth aspect of the present disclosure is to provide a second system for segmenting a raw 3D medical image to yield a plurality of raw-image segmentation masks. The second system comprises one or more computing devices configured to execute a second computing process for segmenting the raw 3D medical image to yield the plurality of raw-image segmentation masks according to any of the embodiments of the second computer-implemented process 900.

In the first and second systems, an individual computing device may be a general-purpose computer, a special-purpose computer such as the one implemented with artificial intelligence processor(s), a desktop computer, a physical computing server, a distributed computing server, or a mobile computing device such as a smartphone and a tablet computer.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

[1] O. Ronneberger, P. Fischer, and T. Brox, "U-net: Convolutional networks for biomedical image segmentation," in *International Conference on Medical image computing and computer-assisted intervention*, Springer, 2015, pp. 234-241.

[2] F. Isensee, P. F. Jaeger, S. A. Kohl, J. Petersen, and K. H. Maier-Hein, "nnu-net: a self-configuring method for deep learning-based biomedical image segmentation," *Nature methods*, vol. 18, no. 2, pp. 203-211, 2021.

[3] D. Pathak, P. Krahenbuhl, and T. Darrell, "Constrained convolutional neural networks for weakly supervised segmentation," in *Proceedings of the IEEE international conference on computer vision*, 2015, pp. 1796-1804.

[4] Z. Jia, X. Huang, I. Eric, C. Chang, and Y. Xu, "Constrained deep weak supervision for histopathology image segmentation," *IEEE transactions on medical imaging*, vol. 36, no. 11, pp. 2376-2388, 2017.

[5] H. Kervadec, J. Dolz, M. Tang, E. Granger, Y. Boykov, and I. B. Ayed, "Constrained-CNN losses for weakly supervised segmentation," *Medical image analysis*, vol. 54, pp. 88-99, 2019.

[6] M. Bateson, H. Kervadec, J. Dolz, H. Lombaert, and I. B. Ayed, "Constrained domain adaptation for segmentation," in *International Conference on Medical Image Computing and Computer-Assisted Intervention*. Springer, 2019, pp. 326-334.

[7] Z. Tian, C. Shen, X. Wang, and H. Chen, "BoxInst: High-performance instance segmentation with box annotations," in *Proceedings of the IEEE/CVF Conference on Computer Vision and Pattern Recognition*, 2021, pp. 5443-5452.

[8] T. Budrys, V. Veikutis, S. Lukosevicius, R. Gleizniene, E. Monastyreckiene, and I. Kulakiene, "Artifacts in magnetic resonance imaging: how it can really affect diagnostic image quality and confuse clinical diagnosis?" *Journal of Vibroengineering*, vol. 20, no. 2, pp. 1202-1213, 2018.

[9] F. E. Boas, D. Fleischmann et al., "CT artifacts: causes and reduction techniques," *Imaging in Medicine*, vol. 4, no. 2, pp. 229-240, 2012.

[10] S. N. Sarkar, D. B. Hackney, R. L. Greenman, B. A. Vachha, E. A. Johnson, S. Nagle, and G. Moonis, "A subjective and objective comparison of tissue contrast and imaging artifacts present in routine spin echoes and in iterative decomposition of asymmetric spin echoes for soft tissue neck MRI," *European journal of radiology*, vol. 102, pp. 202-207, 2018.

[11] H. Xie, H. Yao, S. Zhou, J. Mao, S. Zhang, and W. Sun, "GRnet: Grid-ding residual network for dense point cloud completion," in *European Conference on Computer Vision*. Springer, 2020, pp. 365-381.

[12] K. Chaitanya, E. Erdil, N. Karani, and E. Konukoglu, "Contrastive learning of global and local features for medical image segmentation with limited annotations," *Advances in Neural Information Processing Systems*, vol. 33, pp. 12 546-12 558, 2020.

[13] T. Chu, X. Li, H. V. Vo, R. M. Summers, and E. Sizikova, "Improving weakly supervised lesion segmentation using multi-task learning," in *Medical Imaging with Deep Learning*, PMLR, 2021, pp. 60-73.

[14] Q.-Y. Zhou, J. Park, and V. Koltun, "Open3D: A modern library for 3D data processing," arXiv:1801.09847, 2018.

[15] E. Jang, S. Gu, and B. Poole, "Categorical reparameterization with gumbel-softmax," arXiv preprint arXiv: 1611.01144, 2016.

What is claimed is:

1. A computer-implemented method for segmenting an input three-dimensional (3D) medical image to give a plurality of segmentation masks, the method comprising:
    setting up a backbone, a mask head and a contrastive head, the backbone being a first artificial neural network (ANN) for generating a plurality of feature maps from the input 3D medical image, the mask head being a second ANN for generating the plurality of segmentation masks form the plurality of feature maps, the contrastive head being a third ANN for mapping feature-map pixels of the plurality of feature maps to an embedding space so as to determine a position of each feature-map pixel in the embedding space for evaluating a contrastive similarity between any two of the feature-map pixels; and
    training the backbone, mask head and contrastive head with a plurality of training images, an individual training image being a 3D image annotated with one or more bounding-box annotations, an individual bounding-box annotation specifying a bounding box and a proposed organ located therein, wherein:
        in the training of the backbone, mask head and contrastive head with the plurality of training images, an individual training image is treated as the input 3D medical image and is processed by the backbone, mask head and contrastive head to generate the plurality of feature maps, the plurality of segmentation masks and the position of each feature-map pixel in the embedding space such that the plurality of segmentation tasks is obtained by segmenting the individual training image;
        the mask head utilizes a template organ as a geometric prior of the proposed organ in segmenting the individual training image for enhancing distinguishability of the proposed organ against background in presence of complex shape of the proposed organ;
        the mask head further utilizes contrastive similarity information of the plurality of feature maps in segmenting the individual training image for enhancing distinguishability of the proposed organ against background in presence of imaging artifacts in the individual training image;
        the mask head is trained by optimizing model parameters thereof in a sense of minimizing a loss computed by a sum of a geometric prior loss and a contrastive similarity loss for enhancing a performance of segmenting the input 3D medical image in inference in presence of complex organ shape and imaging artifacts in the input 3D medical image;
        the training of the backbone, mask head and contrastive head comprises training the mask head with the individual training image, wherein the training of the mask head with the individual training image comprises:
  generating a proposal specifying the proposed organ inside the individual training image according to the individual bounding-box annotation;
  identifying the template organ as the geometric prior of the proposed organ;
  computing the geometric prior loss for the proposal according to a distance between first and second point clouds, the first point cloud representing the template organ, the second point cloud representing the proposed organ, the first and second point clouds being aligned;
  computing the contrastive similarity loss for the proposal according to segmentation-mask pixels of the plurality of segmentation masks and respective positions of the feature-map pixels in the embedding space;
  updating the model parameters of the mask head according to the sum of the geometric prior loss and the contrastive similarity loss; and
  performing the updating of the model parameters of the mask head for respective proposals generated for the one or more bounding-box annotations;
the computing of the contrastive similarity loss for the proposal comprises:
  pre-training the contrastive head with a plurality of positive labels and a plurality of negative labels by optimizing model parameters of the contrastive head in a sense of minimizing a distance between neighboring positive labels in the plurality of positive labels while maximizing a distance between neighboring negative labels in the plurality of negative labels; and
  after the contrastive head is pre-trained, using the contrastive head to process the plurality of feature maps to generate the respective positions of the feature-map pixels in the embedding space;
the contrastive head is pre-trained by performing a coarse stage and then a refine stage of pre-training;
in the coarse stage, the plurality of positive labels is a first plurality of positive labels, and the plurality of negative labels is a first plurality of negative labels, wherein the first plurality of positive labels is composed of the feature-map pixels located in the bounding box, and the first plurality of negative labels is composed of the feature-map pixels located outside the bounding box; and
in the refine stage, the plurality of positive labels is a second plurality of positive labels, and the plurality of negative labels is a second plurality of negative labels, wherein the second plurality of positive labels and the second plurality of negative labels are determined by a procedure comprising selecting a predetermined number of negative labels from the first plurality of negative labels as referral pixels, calculating a total distance between a feature-map pixel in the bounding box and each of the referral pixels, and determining whether the feature-map pixel is in the second plurality of positive labels or in the second plurality of negative labels according to the calculated total distance.

2. The method of claim 1, wherein each of the first, second and third ANNs is a convolutional neural network (CNN).

3. The method of claim 1 further comprising:
  setting up a completeness head for determining from the plurality of feature maps whether the proposed organ is a complete organ in the individual training image;
  wherein the proposed organ is removed from being used in training the mask head if the proposed organ is determined to be incomplete in the individual training image.

4. The method of claim 1 further comprising setting up a completeness head for determining from the plurality of feature maps whether the proposed organ is a complete organ in the individual training image, wherein the training of the mask head and contrastive head with the individual training image further comprises:
  using the completeness head to determine whether the proposed organ is a complete organ in the individual training image; and
  responsive to determining that the proposed organ is incomplete in the individual training image, removing the proposed organ from being used in training the mask head.

5. The method of claim 1, wherein the geometric prior loss is computed as a Chamfer distance between the first and second point clouds.

6. The method of claim 1 further comprising:
  using a gridding reverse to convert a volume representation of the proposed organ to generate the second point cloud;
  obtaining a third point cloud as a point-cloud representation of the template organ; and
  applying a sparse registration procedure to the third point cloud for aligning point-cloud representations between the template organ and the proposed organ to thereby obtain the first point cloud, wherein the sparse registration procedure comprises:
    sampling a preselected percentage of points uniformly across each of the second and third point clouds to thereby yield a reduced-size second point cloud and a reduced-sized third point cloud for the proposed organ and the template organ, respectively;
    calculating a transform matrix between the reduced-sized second and third point clouds; and
    registering the third point cloud to the second point cloud according to the transform matrix to yield the first point cloud.

7. The method of claim 6, wherein the preselected percentage is 20%.

8. The method of claim 6, wherein the transform matrix is calculated by an iterative closest point (ICP) registration tool.

9. The method of claim 1, wherein the backbone is a convolutional neural network (CNN) having an encoder-decoder structure.

10. The method of claim 1, wherein the contrastive head is composed of a two-layer point-wise convolution for assisting distinguishing organ tissues from non-organ tissues.

11. A computer-implemented method for segmenting a raw three-dimensional (3D) medical image to yield a plurality of raw-image segmentation masks, the method comprising:
  partitioning the raw 3D medical image into a plurality of 3D patches;
  processing an individual 3D patch by a computing process according to the method of claim 1 to yield the plurality of segmentation masks, wherein the individual 3D patch is treated as the input 3D medical image, whereby respective pluralities of segmentation masks are obtained for the plurality of 3D patches; and concatenating the respective pluralities of segmentation masks to form the plurality of raw-image segmentation masks.

12. A system comprising one or more computing devices configured to execute a computing process for segmenting an input three-dimensional (3D) medical image to give a plurality of segmentation masks according to the method of claim 1.

13. A system comprising one or more computing devices configured to execute a computing process for segmenting a raw three-dimensional (3D) medical image to yield a plurality of raw-image segmentation masks according to the method of claim 11.

\* \* \* \* \*